(12) United States Patent
Kline et al.

(10) Patent No.: US 7,040,977 B1
(45) Date of Patent: May 9, 2006

(54) FISH CLEANING SYSTEM

(76) Inventors: Zane O. Kline, 129 7th Ave. West, Dickinson, ND (US) 58601; Billy L. Freitag, 1744 20th St., S.W., Dickinson, ND (US) 58601

( * ) Notice: Subject to any disclaimer, the term of this patent is extended or adjusted under 35 U.S.C. 154(b) by 38 days.

(21) Appl. No.: 10/881,862

(22) Filed: Jun. 29, 2004

(51) Int. Cl.
*A22C 25/06* (2006.01)

(52) U.S. Cl. .................................................. 452/195

(58) Field of Classification Search ............... 452/125, 452/161, 132, 185, 193, 194, 195; 43/4, 43/21.2, 25, 65
See application file for complete search history.

(56) References Cited

U.S. PATENT DOCUMENTS

| | | | | |
|---|---|---|---|---|
| 5,860,367 A | * | 1/1999 | Riegel et al. | 108/26 |
| 5,944,596 A | * | 8/1999 | Hargrove | 452/105 |
| 6,254,473 B1 | * | 7/2001 | Shore et al. | 452/194 |
| 6,883,267 B1 | * | 4/2005 | Pruitt | 43/54.1 |
| 6,942,562 B1 | * | 9/2005 | Kallas | 452/195 |

OTHER PUBLICATIONS

Intruder Fillet Boards, Intruder Inc. Website Printout, 3 pages, Jun. 20, 2004.
Flexible Cutting Board, Cool Curtain Industries, Website Printout, 1 page, Jun. 20, 2004.

* cited by examiner

*Primary Examiner*—Thomas Price (57) ABSTRACT

A fish cleaning system for efficiently cleaning various sizes of fish. The fish cleaning system includes a platform, a support stand attachable to the platform, a fillet board attached to the platform, a gill clamp attached to the fillet board, a first opening within the platform for receiving a waste bag, and a bag clamp attached to the platform about the first opening for securing a waste bag. The fillet board is preferably pivotally attached to the platform and includes a folding stand for supporting the fillet board at an angle. A support stand is removably attachable to the bottom surface of the platform for supporting the platform at a desired height. A cutting board is attached to an upper surface of the platform and a second opening extends into the platform for receiving a bucket.

4 Claims, 7 Drawing Sheets

FISH CLEANING SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to fish cleaning devices and more specifically it relates to a fish cleaning system for efficiently cleaning various sizes of fish.

2. Description of the Related Art

Fish filleting tables have been in use for years. Typically, cleaning fish has consisted of holding a fish down with a hand on a large, cumbersome flat surface where the fish was filleted with a knife and each portion of the fish had to be separated into edible, retained portions, and non-edible discarded parts.

The problems associated with this previous system for cleaning fish were many-fold. The fish were generally cleaned on a glossy surface, which increased the chances of the fish moving, the knife slipping, and consequently the person filleting the fish cut themselves with the filleting knife.

Another problem was holding the fish in place for filleting with the filleter's hand, which was generally placed over the fish's head since that is a portion that is not necessary to do any cutting to fillet a fish. This practice made it easier for a live fish to move as well, but also made it difficult to secure the fish, especially when handling game fish such as walleye, which have very sharp cheekbones and gills that are capable of lacerating a person's hand.

Another problem was trying to keep straight which portions of the fish were destined for which storage container. Many times the person filleting the fish would place an inedible portion of the fish into the edible portion container. This does not make the edible portion of the fish inedible, but it makes cleanup more difficult and time consuming.

A final problem was the large size and difficulty of washing off these cleaning tables. They were often large, cumbersome and infeasible to be transported efficiently. This problem was generally encountered on fishing vacations when fisherman generally like to fillet fish either on a shore of the lake, where they can then prepare the fish for a "shore lunch," or back at camp when they returned from a day's fishing.

Because of the large size of boards used to clean fish, effective and efficient cleansing and subsequent transportation of the boards was not plausible; separate cleaning tables were usually required at the dwelling and mounted on a boat in some way, shape or fashion if the fisherman planned to have a "shore lunch" during the day.

While these devices may be suitable for the particular purpose to which they address, they are not as suitable for efficiently cleaning various sizes of fish. Conventional fish cleaning devices are sometimes difficult to utilize and sometimes are not capable of handling various sizes of fish.

In these respects, the fish cleaning system according to the present invention substantially departs from the conventional concepts and designs of the prior art, and in so doing provides an apparatus primarily developed for the purpose of efficiently cleaning various sizes of fish.

BRIEF SUMMARY OF THE INVENTION

In view of the foregoing disadvantages inherent in the known types of fish cleaning devices now present in the prior art, the present invention provides a new fish cleaning system construction wherein the same can be utilized for efficiently cleaning various sizes of fish.

The general purpose of the present invention, which will be described subsequently in greater detail, is to provide a new fish cleaning system that has many of the advantages of the fish cleaning devices mentioned heretofore and many novel features that result in a new fish cleaning system which is not anticipated, rendered obvious, suggested, or even implied by any of the prior art fish cleaning devices, either alone or in any combination thereof.

To attain this, the present invention generally comprises a platform, a support stand attachable to the platform, a fillet board attached to the platform, a gill clamp attached to the fillet board, a first opening within the platform for receiving a waste bag, and a bag clamp attached to the platform about the first opening for securing a waste bag. The fillet board is preferably pivotally attached to the platform and includes a folding stand for supporting the fillet board at an angle. A support stand is removably attachable to the bottom surface of the platform for supporting the platform at a desired height. A cutting board is attached to an upper surface of the platform and a second opening extends into the platform for receiving a bucket.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a fish cleaning system that will overcome the shortcomings of the prior art devices.

A second object is to provide a fish cleaning system for efficiently cleaning various sizes of fish.

Another object is to provide a fish cleaning system that is portable and that has a compact storage size.

An additional object is to provide a fish cleaning system that organizes the process of fish cleaning.

A further object is to provide a fish cleaning system that can be utilized in various locations.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better appreciated when considered in conjunction with the accompanying drawings, in which like reference characters designate the same or similar parts throughout the several views, and wherein.

DETAILED DESCRIPTION OF THE INVENTION

A. Overview

Turning now descriptively to the drawings, in which similar reference characters denote similar elements throughout the several views, FIGS. 1 through 7 illustrate a fish cleaning system 10, which comprises a platform 20, a support stand 70 attachable to the platform 20, a fillet board 40 attached to the platform 20, a gill clamp 50 attached to the fillet board 40, a first opening 22 within the platform 20 for receiving a waste bag 16, and a bag clamp 60 attached to the platform 20 about the first opening 22 for securing a waste bag 16. The fillet board 40 is preferably pivotally attached to the platform 20 and includes a folding stand 44 for supporting the fillet board 40 at an angle. A support stand 70 is removably attachable to the bottom surface of the platform 20 for supporting the platform 20 at a desired height. A cutting board 30 is attached to an upper surface of the platform 20 and a second opening 23 extends into the platform 20 for receiving a bucket 14.

B. Platform

The platform 20 may be comprised of various structures capable of supporting fish 12, fillet knives and the like. The platform 20 is preferably a rigid and flat structure as illustrated in FIGS. 1 through 4 of the drawings. The platform 20 may be comprised of various materials such as but not limited to metal, wood, plastic, composite and the like. The platform 20 may have various shapes and sizes as can be appreciated by one skilled in the art.

A second opening 23 preferably extends into the platform 20 for removably receiving a bucket 14 or other similar structure. The second opening 23 preferably has a circular shape having a diameter sized to snugly fit about an upper portion of the bucket 14 to prevent the bucket 14 from passing through the platform 20. The bucket 14 may be utilized for various purposes such as but not limited to storage of the fillets.

Figure 5:
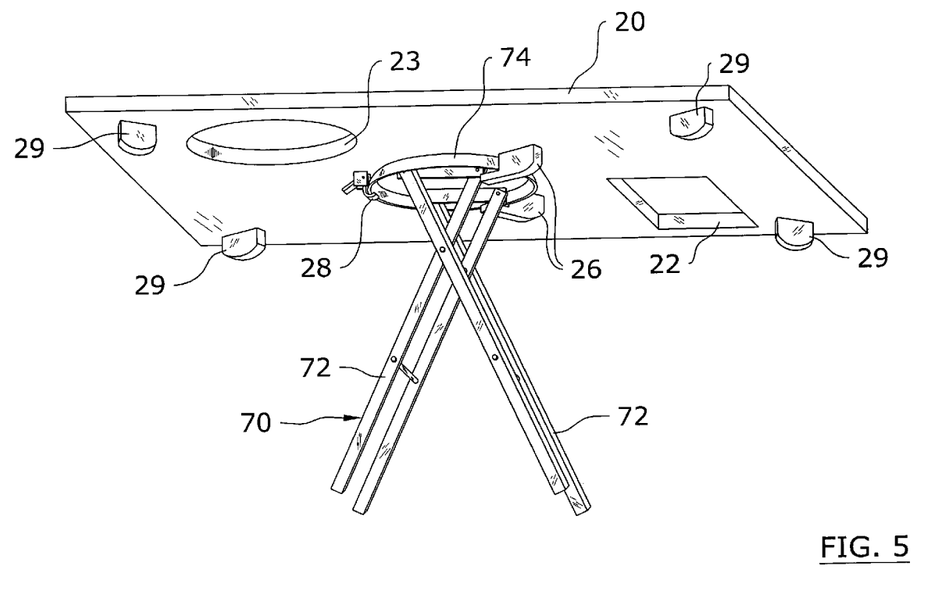
FIG. 5 is a lower perspective view of the present invention.
Figure 6:
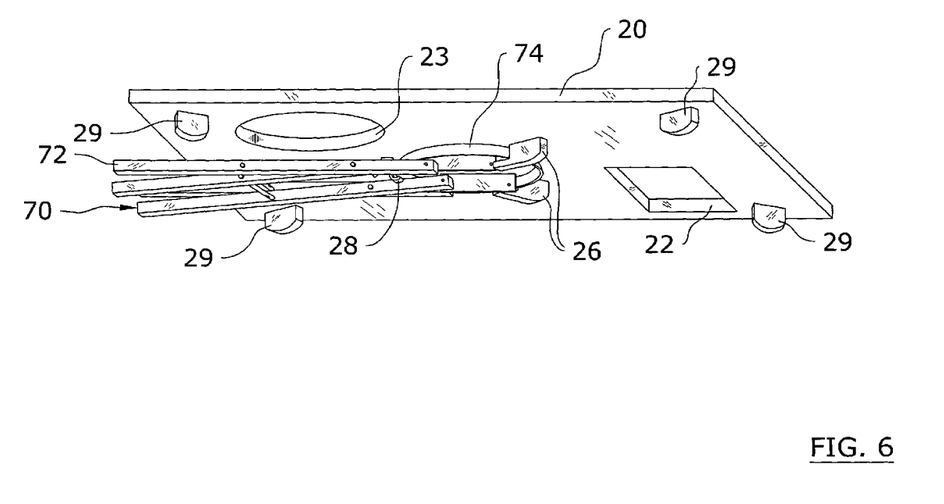
FIG. 6 is a lower perspective view of the present invention with the support stand folded.
Figure 7:
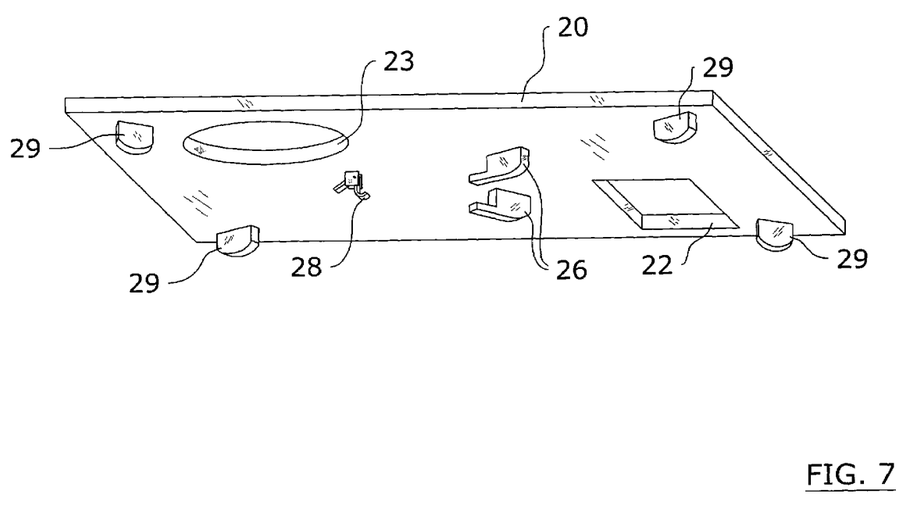
FIG. 7 is a lower perspective view of the platform with the support stand removed.

The platform 20 also preferably includes plurality of feet 29 extending from a bottom surface of the platform 20 as best illustrated in FIGS. 5 through 7 of the drawings. The feet 29 provide support for the platform 20 when positioned upon a flat surface (e.g. table, countertop, floor, etc.).

C. Support Stand

The support stand 70 has a plurality of legs 72 and is attachable to the platform 20 as shown in FIGS. 1, 3 through 6 of the drawings. The support stand 70 may have various structures capable of supporting the platform 20 at a desired height as can be appreciated. However, the support stand 70 is preferably comprised of a collapsible structure as best illustrated in FIGS. 5 and 6 of the drawings.

A plurality of catch members 26 and a latch 28 are preferably attached to a bottom surface of the platform 20 for catchably receiving an edge of an upper member 74 of the support stand 70 as shown in FIGS. 5 through 7 of the drawings. To attach the upper member 74 of the support stand 70, the user inserts the edge of the upper member 74 within the catch members 26 and then pivots the upper member 74 onto the platform 20 so that the latch 28 catchably engages the upper member 74. To remove the support stand 70 from the platform 20, the latch 28 is released and the upper member 74 is thereafter pivoted out of the catch members 26.

D. Fillet Board

A fillet board 40 is preferably pivotally attached to the platform 20 as shown in FIGS. 1 through 4 of the drawings. The fillet board 40 is preferably comprised of an elongated structure with a gripping surface 42. The gripping surface 42 may be comprised of any non-slip material for reducing the movement of a fish 12 when positioned upon the fillet board 40.

Figure 1:
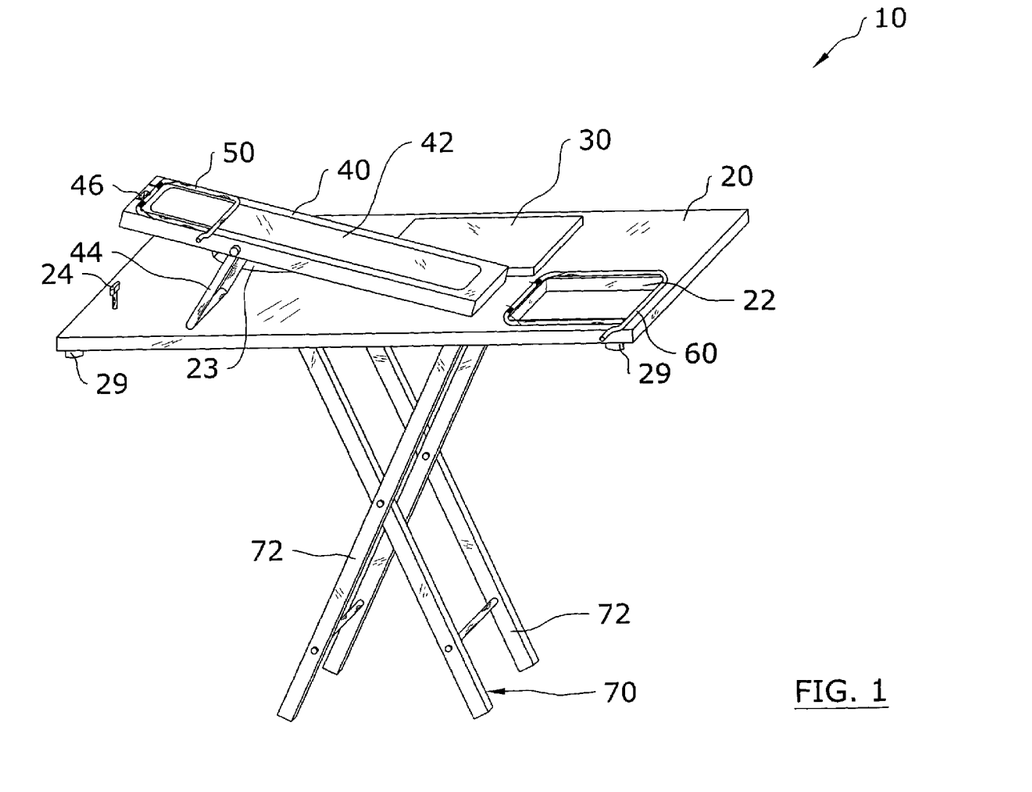
FIG. 1 is an upper perspective view of the present invention.
Figure 3:
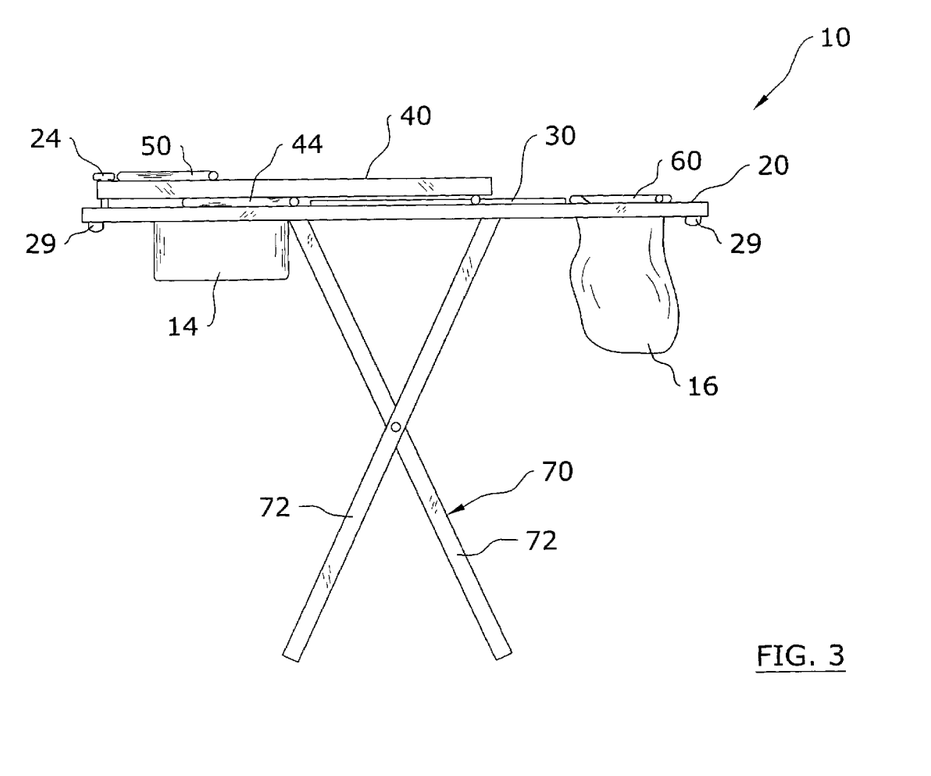
FIG. 3 is a side view of the present invention with the fillet board in the storage position.
Figure 4:
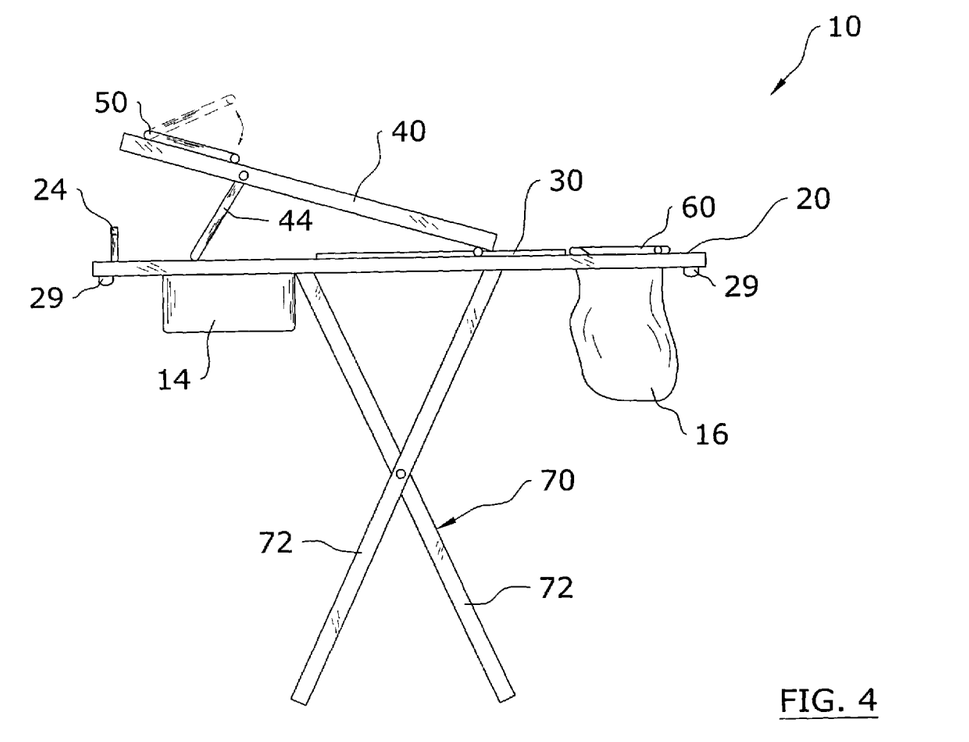
FIG. 4 is a side view of the present invention with the fillet board in the upright position.

A folding stand 44 is preferably attached between the fillet board 40 and the platform 20 for selectively supporting the fillet board 40 at an angle as shown in FIGS. 1, 3 and 4 of the drawings. The folding stand 44 may be attached to the platform 20 with removable connection to the fillet board 40 or vice-versa.

A gill clamp 50 is preferably pivotally attached to an upper portion of the fillet board 40 for securing a fish 12 to the fillet board 40 as shown in FIG. 1 of the drawings. The gill clamp 50 is preferably biased downwardly upon the fillet board 40 for retaining the fish 12 upon the fillet board 40. The gill clamp 50 is preferably comprised of a loop (or semi-loop) structure having a handle, wherein a portion of the gill clamp 50 opposite of a hinged portion is capable of catchably engaging a gill of a fish 12 as illustrated in FIG. 2 of the drawings.

Figure 2:
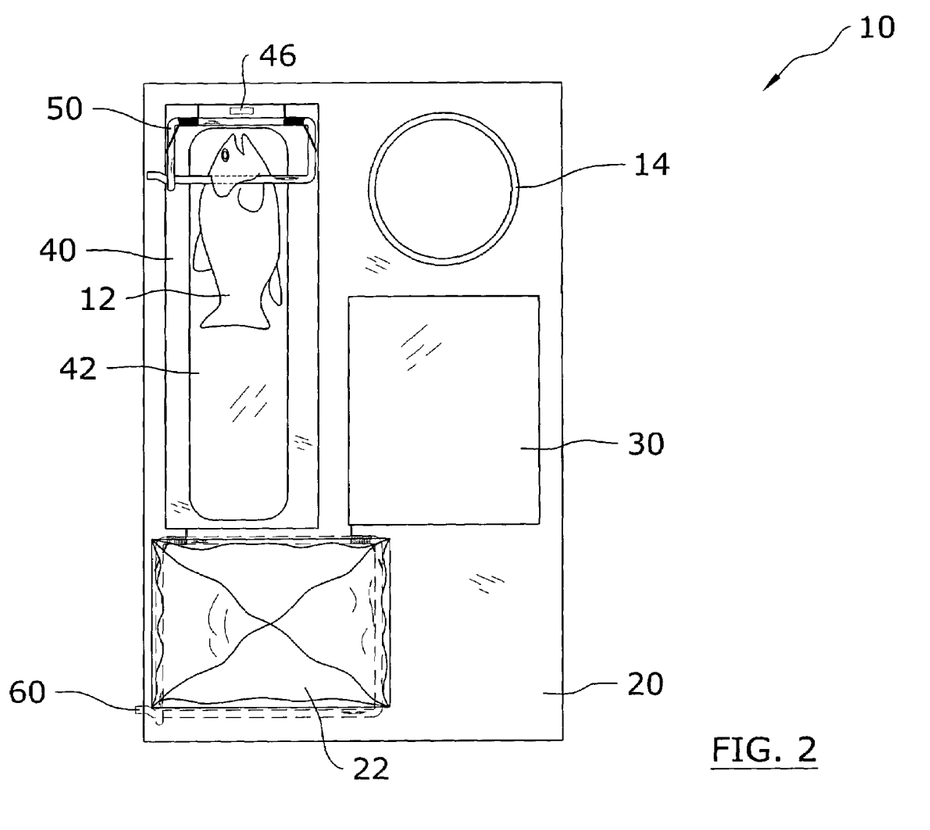
FIG. 2 is a top view of the present invention with a fish retained upon the fillet board by the gill clamp.

The fillet board 40 preferably includes a locking aperture 46 as shown in FIGS. 1 and 2 of the drawings. A locking member 24 having a flanged upper end rotatably extends upwardly from the platform 20 for being received within the locking aperture 46 for securing the fillet board 40 to the platform 20. The locking aperture 46 has an elongated structure that receives the flanged portion of the locking member 24 and wherein the flanged portion catchably retains the fillet board 40 when rotated transversely with respect to the locking aperture 46.

E. First Opening

A first opening 22 preferably extends through the platform 20 at an end of the fillet board 40 opposite of the gill clamp 50 for receiving waste material as illustrated in FIG. 1 of the drawings. The first opening 22 is sufficient in size to allow for the passage of waste material from cleaning fish 12. A bag clamp 60 is preferably pivotally attached to the platform 20 about the first opening 22 for securing a waste bag 16 or similar waste receiver. The bag clamp 60 is preferably biased and similar in structure to the gill clamp 50.

F. Cutting Board

At least one cutting board 30 is preferably attached to the platform 20. The cutting board 30 may be comprised of various sizes, shapes and materials commonly utilized for cutting boards 30. The cutting board 30 is preferably to the side of the fillet board 40, however the cutting board 30 may be positioned in various other locations upon the platform 20.

G. Operation of Invention

In use, the user attaches the support stand 70 to the platform 20 and extends the legs 72 of the support stand 70 to support the platform 20 as shown in FIGS. 1, 3, 4 and 5 of the drawings. The user then pivots the fillet board 40 from a flat position (FIG. 3) to a raised and angled position (FIG. 4) by adjusting the folding stand 44. The user then inserts a waste bag 16 (e.g. plastic bag) into the first opening 22 and positions the upper portion of the waste bag 16 about the bag clamp 60. The bag clamp 60 is then allowed to secure the upper portion of the waste bag 16 to the platform 20 as shown in FIG. 4 of the drawings. The user may position a bucket 14 of water within the second opening 23 to place the cut fillets within. The fish 12 is then positioned upon the fillet board 40 with the gill clamp 50 raised. The user lowers the gill clamp 50 so that a portion is catchably retained within the gill as shown in FIG. 2 of the drawings. After the fish 12 is secured to the fillet board 40, the user is then able to remove the remove the fillets from the fish 12 and then cut the same upon the cutting board 30. After the first side fillet is removed from the fish 12, the fish 12 is then flipped over to the other side to remove the second side fillet. After both side fillets have been removed, the fish 12 and other waste are then discarded down into the waste bag 16. This process proceeds until all of the fish 12 are cleaned. The user then may disassemble the present invention by lowering the fillet board 40 and removing the support stand 70.

What has been described and illustrated herein is a preferred embodiment of the invention along with some of its variations. The terms, descriptions and figures used herein are set forth by way of illustration only and are not meant as limitations. Those skilled in the art will recognize that many variations are possible within the spirit and scope of the invention, which is intended to be defined by the following claims (and their equivalents) in which all terms are meant in their broadest reasonable sense unless otherwise indicated. Any headings utilized within the description are for convenience only and have no legal or limiting effect.

We claim:

1. A fish cleaning system, comprising:
   a platform;
   a second opening extending into said platform for receiving a bucket;
   a plurality of feet extending from a bottom surface of said platform;
   a support stand having a plurality of legs attachable to said platform;
   a plurality of catch members and a latch attached to a bottom surface of said platform for catchably receiving an edge of an upper member of said support stand;
   a fillet board pivotally attached to said platform;
   a folding stand attached between said fillet board and said platform for selectively supporting said fillet board at an angle;
   a gill clamp pivotally attached to an upper portion of said fillet board for securing a fish to said fillet board, wherein said gill clamp is biased and is comprised of a loop structure having a handle, wherein a portion of the gill clamp opposite of a hinged portion is capable of catchably engaging a gill of a fish;
   a first opening at an end of said fillet board opposite of said gill clamp for receiving waste material; and
   a bag clamp pivotally attached to said platform about said first opening for securing a waste bag.

2. The fish cleaning system of claim 1, wherein said fillet board includes a gripping surface which engaging a fish when positioned upon said fillet board.

3. The fish cleaning system of claim 1, including a cutting board attached to said platform.

4. The fish cleaning system of claim 1, wherein said fillet board includes a locking aperture and a locking member extending from said platform for being received within said locking aperture for securing said fillet board to said platform, wherein said locking member has a flanged upper end and is rotatably attached to said platform.

* * * * *